Aug. 12, 1941.  C. T. MILLER  2,252,639
PAINTER'S POT HANGER
Filed Aug. 6, 1940  2 Sheets-Sheet 1
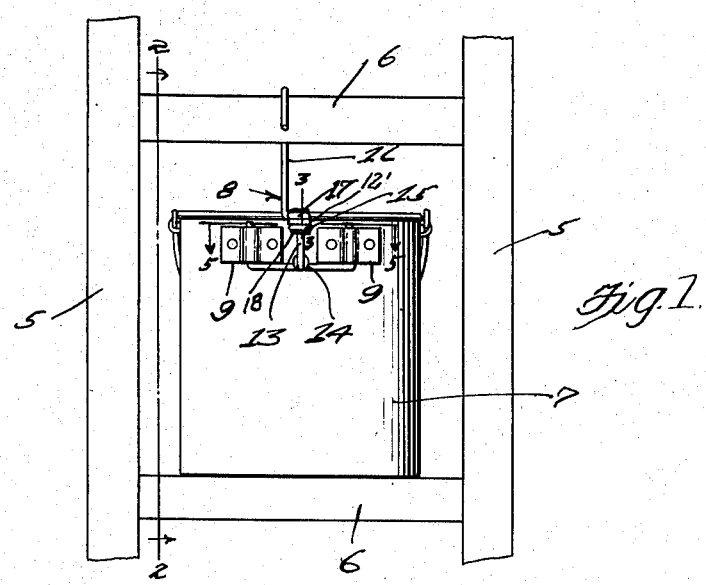
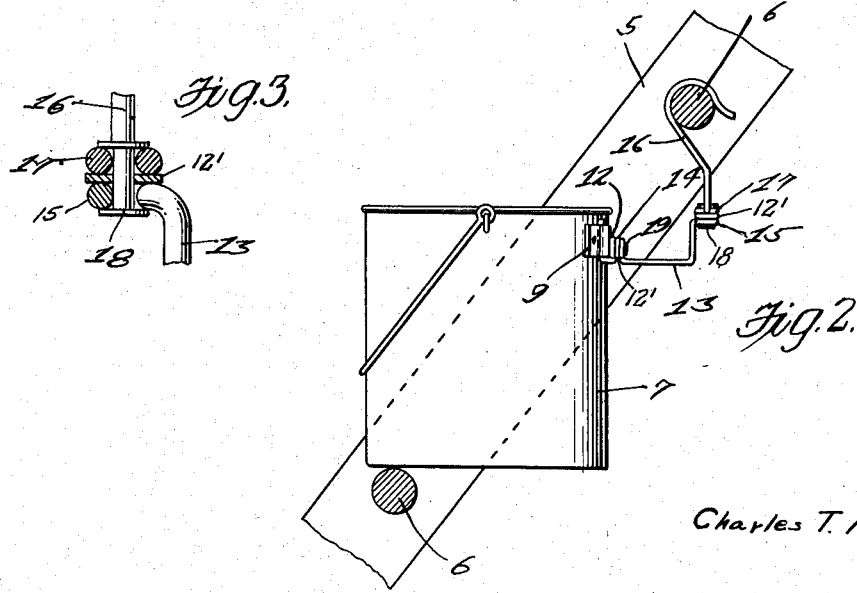
Inventor
Charles T. Miller
By Clarence A. O'Brien
Attorney Aug. 12, 1941.  C. T. MILLER  2,252,639
PAINTER'S POT HANGER
Filed Aug. 6, 1940   2 Sheets-Sheet 2

Inventor
Charles T. Miller
By Clarence A. O'Brien
Attorney

Patented Aug. 12, 1941

2,252,639

UNITED STATES PATENT OFFICE 2,252,639

PAINTER'S POT HANGER

Charles T. Miller, Paramus, N. J.

Application August 6, 1940, Serial No. 351,579

1 Claim. (Cl. 248—211)

This invention appertains to new and useful improvements in hanger means for painter's pots and more particularly to a hanger which can be employed for hanging a painter's pot in various positions on a ladder.

The principal object of the present invention is to provide a painter's pot hanger which can be utilized for hanging a painter's pot in any number of different positions depending upon where the painter is painting in relation to the ladder.

Other objects and advantages of the invention will become apparent to the reader of the following specification.

In the drawings:

Figure 1 represents a front elevational view of a ladder showing the hanger employed and the pot being supported betwen the side runners.

Figure 2 is a sectional view on the line 2—2 of Figure 1.

Figure 3 is a section on the line 3—3 of Figure 1.

Figure 6:
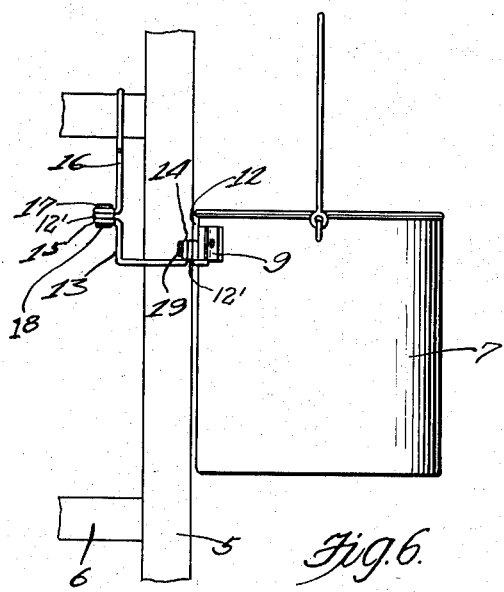
Figure 6 is a fragmentary front elevational view showing the pot supported at the right side of the ladder.
Figure 4:
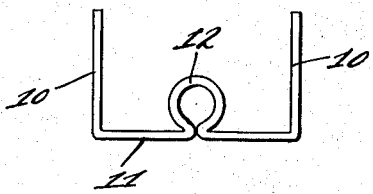
Figure 4 is a front elevational view of the U-shaped member.
Figure 7:
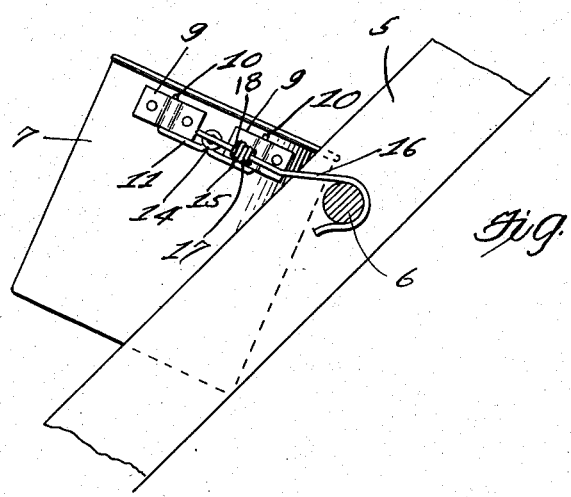
Figure 7 is a vertical sectional view through a ladder showing the pot supported at the left of the ladder.
Figure 5:
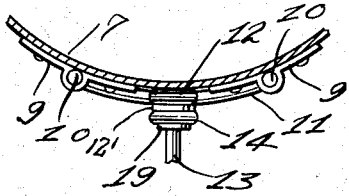
Figure 5 is a fragmentary, detailed sectional view taken substantially on the line 5—5 of Figure 1.

Referring to the drawings wherein like numerals designate like parts, it can be seen that numerals 5, 5 denote the side runners of a ladder connected by rungs 6. Numeral 7 denotes a painter's pot with the improved hanger generally referred to by numeral 8 attached thereto.

This hanger consists in the provision of a pair of plates 9, 9 riveted to the pot 7 adjacent its upper edge and each formed with an offset intermediate transverse portion defining socket for the reception of the leg portions 10, 10 of a U-shaped member 11.

The U-shaped member 11 has an eye 12 formed at the intermediate portion of its bight.

Numeral 13 denotes a substantially L-shaped connector member having an eye 14 at one end and an eye 15 at its opposite end. A hook member 16 has an eye member 17 at the end of its shank. A rivet or the like 18 extends through the eyes 15 and 17 to swivelly connect the hook 16 to the L-shaped member 13. Furthermore, a rivet 19 extends through the eyes 12 and 14 for swivelly connecting the connector 13 to the U-shaped member 11.

It can now be seen that a swivelled action of the hook 16 can be had with respect to the L-shaped member 13 and a swivelled action of the L-shaped member can be had with respect to the U-shaped member 11, to the end that the painter's pot can be supported in various positions convenient for the painter as he paints from various sides or through the ladder.

The eyes 12 and 14 and the eyes 15 and 17 have lock washers 12' therebetween to place tension on said eyes for sustaining any of the adjusted positions of the hook 16 and the L-shaped connector member 13.

While the foregoing specifications sets forth the invention in specific terms, it is to be understood that numerous changes in the shape, size and materials may be resorted to without departing from the spirit and scope of the invention.

Having described the invention, what is claimed as new is:

A hanger of the character described comprising a substantially U-shaped receptacle attachable element having an eye intermediate its end portions, a substantially lateral connector, upstanding end portions on said connector, one upstanding end portion having a lateral opening therethrough and the other upstanding end portion having a vertical opening therethrough, means extending through said eye and the lateral opening in said one upstanding end portion to swivelly secure said lateral connector and U-shaped element, a hook, a shank on said hook, a laterally disposed end portion on said shank having a vertical opening therein in alignment with said vertical opening in said other upstanding end portion of said connector, and means extending through said aligned openings for swivelly securing the laterally disposed end portion on said shank and the said other upstanding end portion of said connector together.

CHARLES T. MILLER.